March 7, 1950  B. KREUZER ET AL  2,499,593
REVERBERATION TIME MEASURING SYSTEM
Filed March 17, 1943
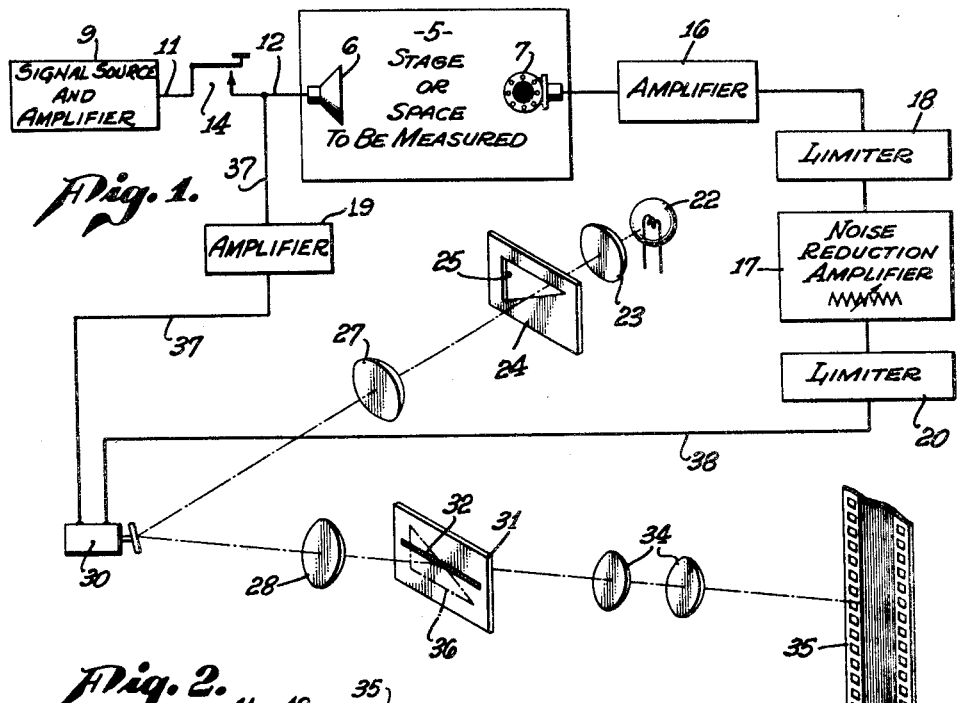
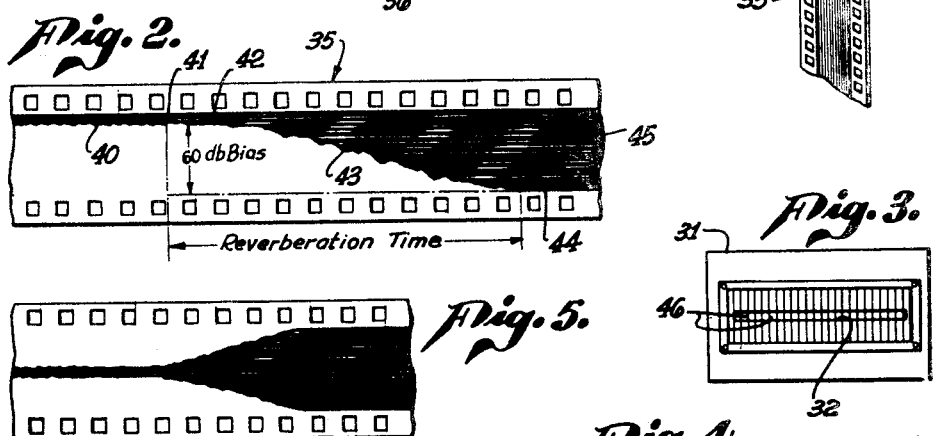
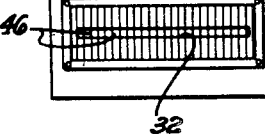
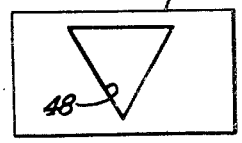
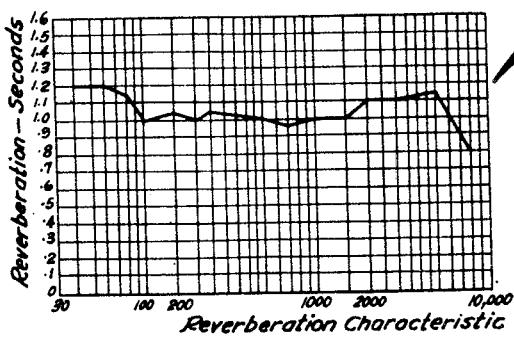
BARTON KREUZER,
IRL R. GOSHAW,
INVENTORS
BY
ATTORNEY.

Patented Mar. 7, 1950

2,499,593

UNITED STATES PATENT OFFICE 2,499,593

REVERBERATION TIME MEASURING SYSTEM

Barton Kreuzer, Los Angeles, and Irl R. Goshaw, Beverly Hills, Calif., assignors to Radio Corporation of America, a corporation of Delaware Application March 17, 1943, Serial No. 479,428

7 Claims. (Cl. 346—33)

1

This invention relates to sound measuring systems and particularly to sound reflection or reverberation testing and measuring circuits of the recording type.

In the art of constructing or modifying theaters, sound stages, and other confined spaces in which sound waves are generated and propagated to listeners or sound pick-up devices, the amount and variation, or characteristic of the reflection of the sound waves are important factors affecting the intelligibility of the sound when it reaches the listeners or the quality of the sound when it reaches the sound pick-up devices. A series of these reflections produced from a multiplicity of image sources, is known as reverberation, a reverberation characteristic being the variation of reverberation time with frequency. The size, shape, construction materials of, and the furnishings within a sound propagating space, all affect the reverberation characteristic. This characteristic is generally of a nature dependent upon the frequency of the sound waves and portions of a multifrequency signal may be reinforced or neutralized by reflections and considerable distortion introduced in the propagated signal in this manner.

Thus, to properly position a pick-up device, with respect to a sound source or a sound source with respect to a listening audience, the reflection or reverberation characteristic of the listening or pick-up space should be known. If the area cannot be made satisfactory by positioning of the sound source or pick-up device, then it may be necessary to modify the listening space in a manner well-known in the art, such as by the proper use of draperies or other sound absorbing materials. The construction of a modern type of recording studio is described in an article by Michael Rettinger in the Journal of the Society of Motion Picture Engineers for September, 1942.

Before any modification of a sound propagating space be made, however, a reverberation characteristic thereof should be obtained and studied, this being particularly desirable for sound recording stages wherein either sound is recorded during the photographing of a concomitant scene or where only sound recording occurs, such as pre and post scoring for motion pictures or for the production of phonograph records. To enable the plotting of a reverberation characteristic, a plurality of sound decay curves at different frequencies are necessary, the present invention being directed to a system for obtaining such curves.

2

In the usual type of sound recording studios or stages, apparatus such as loud speakers, microphones, amplifiers, recorders, and other associate equipment are generally available, the present invention making use of this equipment for obtaining not only a measurement of reverberation, but also a record of the reverberation time curve. Special high speed reverberation measuring systems are known in the art wherein a calibrated paper strip is advanced at a predetermined rate, and on which is recorded the magnitude of the reflected sound waves as the sound decays in the room after the original source has ceased generating sound waves. The present invention utilizes either sound recording equipment already installed for producing a similar type of record, or portable sound recording equipment which may be taken to any area where a measurement is desired.

The principal object of the invention, therefore, is to measure reverberation time of a listening or sound pick-up space and obtain a record of the sound decay.

Another object of the invention is to utilize normal sound recording equipment for obtaining a record of reverberation time.

A further object of the invention is to produce a record of reverberation time in which the variations in the magnitude of the decaying sound pressure is visually observable this magnitude, at any instant, is readable on the record.

A further object of the invention is to provide a reverberation time measuring and recording system utilizing standard sound recording apparatus.

A further object of the invention is to obtain at any instant a record of the average pressure magnitude and reverberation of a sound originating in a combined space.

A further object of the invention is to provide a system for producing a reverberation record of a confined listening space in which the magnitude of the decaying sound pressure at any instant, as the sound signals decay, is visually indicated.

Although the novel features which are believed to be characteristic of this invention will be pointed out with particularity in the appended claims, the manner of its organization and the mode of its operation will be better understood by referring to the following description read in conjunction with the accompanying drawings forming a part hereof, in which:

Fig. 1 is a diagrammatic view of a system embodying the invention.

Fig. 2 is a reverberation time record made in accordance with the invention.

Fig. 3 is a detail view of an element of the system of Fig. 1.

Fig. 4 is a detail view of a modification of an element of the system of Fig. 1.

Fig. 5 is a reverberation record made in accordance with the modification shown in Fig. 4, and Fig. 6 is a typical reverberation characteristic of a sound recording stage.

Referring now to Fig. 1, a stage or similar type of confined space in which the reverberation time is to be measured and a record thereof obtained, is shown at 5, and in which is placed a loud-speaker 6 and a sound pick-up device such as a microphone 7. The loud-speaker is supplied with either a constant frequency tone or a warble tone, preferably the latter, from a source 9 such as a film reproducer, if the signal tone is on a film record, or a disk phonograph, if the tone is on a disk. A warble tone is one of continuous varying frequency between limits such as plus and minus ten per cent of a given frequency. For instance, a 500 cycle warble tone is one which may vary continuously between 450 and 550 cycles per second, a warble tone providing a smoother decay curve than a single frequency tone. In order to obtain a reverberation characteristic, a plurality of warble tones of different frequencies may be supplied from the source 9.

The tone source 9 is connected over conductors 11 and 12 to the loud-speaker 6, a switch 14 being provided to connect and disconnect the source to and from the loud-speaker at will. The microphone 7 feeds an amplifier 16, the output of which is connected to an amplifier-rectifier combination 17, commonly known in the sound recording art as a noise reduction amplifier, through a limiter 18. The output of the noise reduction amplifier 17 is connected to a second limiter 20, these limiters being optional additions to prevent damage to any portion of the system.

A sound film recording system is illustrated as including a light source 22, a collecting lens 23, a mask 24 with a triangular slit 25 therein, projection lenses 27 and 28 in the optical path on each side of a galvanometer 30, a mask 31 having a slit 32 therein, objective lenses 34, and a film 35. A light image 36, shown in dotted lines on the mask 31, is that of the aperture 25 in the mask 24. The galvanometer 30 is of the well-known double winding type, the usual modulating winding being connected to conductor 12 through amplifier 19 over conductors 37, this winding varying the light beam 36 across the slit 32 in accordance with the output of the signal source 9, the signal source having its own amplifier. The second or bias winding of the galvanometer 30 is connected by a conductor 38 to the output of limiter 20 and will vary the light beam in accordance with the average value of the amplitude of the signal picked-up by microphone 7. Single line connections have been shown between the various elements in the above system for the sake of clarity.

The above recording elements or their equivalents are those usually employed in a standard sound recording channel, the noise reduction amplifier input being normally connected to the signal source and the output thereof being connected either to the second or bias winding, as shown, when that form of noise reduction is employed, or to a shutter motor, such as shown in U. S. Patent 2,269,074 of January 6, 1942. The form of aperture 25 is adapted to produce what is known as a single modulated track, and in the present invention the optical system may be modified so that the entire picture area of the film is utilized for recording instead of only the sound track area. By increasing the record size, greater reading accuracy is provided, and visual inspection of the record is facilitated.

The type of track produced by the system of Fig. 1 is shown in Fig. 2. It is well to point out here that reverberation time is defined as the number of seconds required for the reverberation signal to drop 60 db. in intensity after the original steady signal has ceased. With this definition in mind, therefore, the noise reduction amplifier is adjusted so that with the switch 14 closed and a signal impressed on the speaker 6, the mirror of the galvanometer 30 is biased to one side of the film recording area, either between the sprocket holes as shown in Fig. 2, or to one side of the sound track area if only this amount of the film is used, to a point 60 db. above the zero signal setting. With the system so adjusted, the instantaneous variations in the warble tone is recorded directly at 40 and will be so recorded until the switch 14 is open, as shown at point 41, which removes the signal from the modulating winding of the galvanometer 30. Due to acoustic transmission delay, however, the signal picked-up by the microphone 7 may not immediately decrease, but will continue at substantially the same level of the warble signal for a short period, as shown by the substantially straight portion 42 of the characteristic, after which the amplitude of the signal picked-up by the microphone 7 will decrease irregularly due to the character of the multiplicity of the sound reflections from the walls, ceiling, and floor of the confined space being measured as shown by the portion 43. At point 44, the magnitude of the decaying sound pressure has decreased 60 db.

As the film is advanced by a mechanism not shown at some uniform speed such as 90 feet a minute or a foot and a half per second, the time required for the film to pass from the point 41 to the point 44 is a direct measure of the reverberation time. If the film is advanced at 1½ feet per second and the points 41 and 44 are 1½ feet apart, the reverberation time is one second. As there are 4 sprocket holes per frame and 24 frames in 1½ feet of film, there are 96 sprocket holes per second, the sprocket holes thus serving as a scale to facilitate measurements of the reverberation time.

It will be observed that the decay curve of the reverberation characteristic is not a smooth curve. This is caused by several factors as mentioned above, such as the configuration of the stage, the materials of which the walls, floor, and ceiling are constructed, and the type and location of the furnishings on the stage. The more the sound is diffused and the more the galvanometer is damped, the smoother the decay curve obtained.

Although the reverberation time is particularly important for obtaining data for a reverberation characteristic, it is also desirable to accurately read the amount of the variations in magnitude of the reflections at different times after the sound at the source ceases. To obtain this feature, the recording system provides db. calibration lines, as shown at 45 in Fig. 2, each adjacent line transversely of the film representing several db. variations in amplitude. To obtain these calibration lines, a lined screen 46 is inserted in or placed over the slit 32, as shown in Fig. 3, wherein the slit 32 is divided by fine wires which form shadows on the film during the period the light beam is impressed over that portion thereof. These shadow calibration lines, therefore, will not appear on the portions of the film on which no light is impressed, but will appear as the reverberation record is recorded, and as they are needed. The termination of the lines at the recorded decay curve aids in reading the record.

It is to be understood, however, that other means may be used for obtaining the calibration lines, such as wires placed in the aperture 25. Whatever the manner used to produce these lines, however, they will permit the various peaks or irregularities in the reverberation decay curve to be measured directly on the record, as shown on the right-hand side of Fig. 2, the record in Fig. 2 representing a negative. In order for the lines to accurately indicate a db. variation which is a logarithmic function, the wires may be logarithmically disposed along the slit 32 or, disposed in uniform steps and the noise reduction amplifier provided with a logarithmic amplifier.

Referring now to Fig. 4, if the mask 24 has an aperture such as shown at 48, then a double trace record will be produced, as shown in Fig. 5, the reverberation time being measured from the point of cessation of the signal tone and the point at which the reflected signal has decreased to a predetermined amount, such as 60 db.

As mentioned above, the signal source 9 may be a record of a number of single frequency or warble tones extending over the audio range of frequencies. As this record is reproduced, a series of reverberation time records, as shown in Fig. 2, may be produced from which the data for plotting a reverberation characteristic, such as shown in Fig. 6 is obtainable. Although the invention has been described for securing a reverberation time record for a sound recording stage, it is to be understood that it is applicable to the measurement of reflections in any type of confined space.

We claim as our invention:

1. A recording system comprising means for generating a substantially constant amplitude current, means for translating said current into sound waves, means for detecting said sound waves and translating them into electrical currents, means for rectifying said detected currents to obtain the average value of said sound waves, a source of light, a light sensitive medium, and means for modulating said light beam for impression on said films, said light beam being simultaneously modulated by both the generated currents which are translated into sound waves and by the average value of the sound waves as detected, said last-mentioned currents varying the zero position of the recording of said generated currents on said light sensitive medium.

2. A recording system in accordance with claim 1 in which the mean position of the record of said signal currents is shifted 60 db. above zero level on said light sensitive medium when said average value current is maximum, means being provided for discontinuing the modulation of said light beam by said constant amplitude generated currents, the number of sprocket holes between the point of discontinuance of the modulation of said light beam by said constant amplitude generated currents and the point on said film where said light beam reaches zero being a measure of the time said light beam is modulated by the average value of said currents.

3. A recording system comprising means for generating a substantially constant amplitude alternating current, means for translating said current into sound waves for propagation in a certain confined space, means for detecting in said space and translating said sound waves and reflections thereof into corresponding electrical currents, the amplitude of said currents varying in accordance with said sound waves directly received and multiple reflections thereof in said space, means for rectifying said currents for obtaining a current corresponding to the average value thereof, and means for combining said constant amplitude alternating current and said average current into a single record, and means for discontinuing the recording of said constant amplitude alternating current while continuing the recording of said average current.

4. A recording system in accordance with claim 3 in which a film is provided on which said single record is recorded at a 60 db. level above zero level, the number of sprocket holes in said film between the point on said film at which the recording of said constant amplitude alternating current was discontinued and the point on said film where said average current reaches zero level being a measure of the reverberation time of said confined space.

5. A system for measuring the reverberation time of a signal in a given confined space comprising a light sensitive medium, means for impressing a light beam on said light sensitive medium, a signal source of alternating current, means for reproducing said signal source as acoustic sound waves in said space, means for modulating said light beam in accordance with the instantaneous values of said signal, means for detecting said acoustic sound waves and reflections thereof in said space, means for rectifying the detected currents to obtain an average value current corresponding to said detected sound waves, means for displacing said light beam as impressed on said light sensitive medium in accordance with the average value current corresponding to said detected sound waves simultaneously with the modulation of said light beam in accordance with the instantaneous values of said signal, means for continuing the impression of said light beam on said light sensitive medium in accordance with said average value current after the reproduction of said signal in said space has been discontinued, and means for indicating the level of said average value current on said medium.

6. A system of recording a sound decay curve in a given space comprising a loudspeaker, means for impressing on said speaker a substantially constant amplitude alternating current signal to generate corresponding sound waves, a microphone in said space for translating said sound waves into electrical currents, means for rectifying said translated currents to obtain an average value of the translated sound waves, a film recording system, means for impressing on said film recording system the instantaneous values of said signal as impressed on said loudspeaker to make a record thereof, and means for simultaneously actuating said recording system in accordance with the average value of the sound waves detected by said microphone, said last mentioned currents varying the mean position of the record of said instantaneous values on the film of said recording system.

7. A system of recording a sound decay curve in accordance with claim 6, in which means are provided to record the combined instantaneous values of said signal and the average value of the sound waves on said film as a single record at a mean position of 60 db. above zero, and further means are provided for discontinuing the impression of the instantaneous values of said signal on said recording system, the number of sprocket holes between the point on said film at which the recording of the instantaneous values of said signal was discontinued and the point where the recording of the average value of the sound waves reaches zero being a measure of the reverberation time of said given space.

BARTON KREUZER.
IRL R. GOSHAW.

REFERENCES CITED

The following references are of record in the file of this patent:

UNITED STATES PATENTS

| Number | Name | Date |
|---|---|---|
| 1,791,207 | Hindle | Feb. 3, 1931 |
| 1,864,527 | Castner | June 28, 1932 |
| 1,880,942 | Erickson | Oct. 4, 1932 |
| 1,907,112 | Hopper | May 2, 1933 |
| 2,277,421 | Suits et al. | Mar. 24, 1942 |
| 2,370,385 | Abraham et al. | Feb. 27, 1945 |

FOREIGN PATENTS

| Number | Country | Date |
|---|---|---|
| 545,465 | Great Britain | May 28, 1942 |

OTHER REFERENCES

Practical Acoustics for the Constructor, Glover, Chapman & Hall Ltd. 1933 London, Chapter 9 (pages 104 to 134) "Measurement of Sound." See page 118, lines 1–8 and Fig. 71.

Electrical Engineers Handbook, Pender & McIlwain, John Wiley & Sons, third ed. (Re.) N. Y. C. Chap. 9 "Acoustics" Sub. 23, "The Measurement of Reverberation."